July 23, 1963

L. H. BRACKEN ET AL
TELEPHONE HOOKSWITCH AND EXCLUSION
KEY INTERLOCKING ARRANGEMENT 3,098,900

Filed March 7, 1960

2 Sheets-Sheet 1

INVENTORS
Lawrence H. Bracken
William R. Watson
BY C. A. Sulbrandsen
Atty.

July 23, 1963 L. H. BRACKEN ET AL 3,098,900

TELEPHONE HOOKSWITCH AND EXCLUSION KEY INTERLOCKING ARRANGEMENT

Filed March 7, 1960 2 Sheets-Sheet 2

INVENTORS
Lawrence H. Bracken
William R. Watson
BY
C. A. Gullbrandsen
Atty.

3,098,900

TELEPHONE HOOKSWITCH AND EXCLUSION KEY INTERLOCKING ARRANGEMENT

Lawrence H. Bracken and William R. Watson, Brockville, Ontario, Canada, assignors to Automatic Electric Laboratories, Inc., Northlake, Ill., a corporation of Delaware Filed Mar. 7, 1960, Ser. No. 13,295
6 Claims. (Cl. 179—99)

This invention relates in general to telephone substation apparatus and more particularly to a telephone hookswitch and exclusion key interlocking arrangement for use in telephone instruments.

The exclusion apparatus shown herein is a modification of that shown in United States application Serial Number 738,476, filed May 28, 1958, by Frederic E. Wood, now United States Patent 2,946,856. In the Wood application, as well as this application the exclusion spring pile-up is actuated by two separate plungers in the handset cradle. One plunger is used as the exclusion button, the other as the release button therefor. The exclusion and release plungers operate semi-independently of the hookswitch plungers.

In exclusion apparatus for telephone lines which are equipped with an extension telephone, the main instrument on the line for example, could be that of an executive and the extension telephone that of his secretary. When a call has been initiated or answered at the executive telephone, the executive may desire to exclude the extension from the line. He then depresses the exclusion button and continues his call in privacy. If he wishes to return the extension to the line, he depresses the release button. In any event, when the call is completed and the handset is replaced in the cradle, it is necessary that the extension be returned to the line in order that the secretary may be able to answer further incoming calls. To further this end, it is required that replacement of the handset release the exclusion mechanism and return the extension to the line.

In the mentioned Wood application, however, it is not possible to signal an operator while the exclusion button is operated. In signalling the operator by manually depressing and releasing rapidly either of the two hookswitch plungers, the exclusion button is restored thus connecting the extension telephone to the line when this may not be desirable.

It is therefore the principal object of this invention to provide a novel combination hookswitch and exclusion arrangement that will permit signalling an operator by flashing one of the two hookswitch plungers while the exclusion mechanism is operated without restoring the latter.

Other objects and advantages of this invention will become apparent from a perusal of the following specification taken in conjunction with the drawings, of which:

Figure 1:
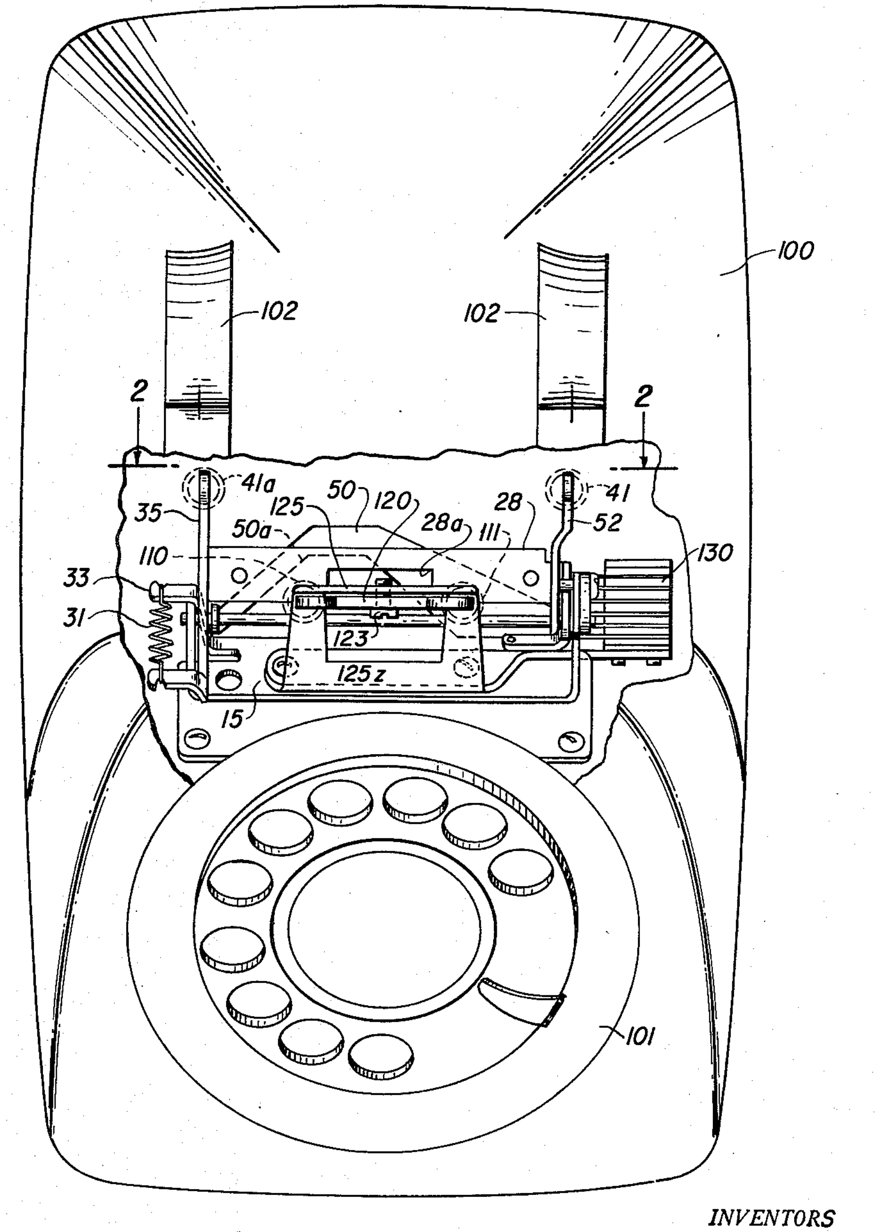
FIG. 1 shows a top view of the telephone desk stand as viewed from the front of the set with a cutout section showing the hookswitch apparatus.

As mentioned, the hookswitch arrangement of the embodiment disclosed herein is adapted for use with the exclusion buttons of the type shown in the cited pending Wood application. For ease of explanation, reference characters in applicants' disclosure, wherever possible, are the same as those shown for the comparable parts in the Wood application.

In general then, the present invention is designed for use in a telephone desk stand in which two hookswitch plungers 41 and **41*a* are mounted between the tines 102 of a handset cradle. Plunger 41*a* acts independently of plunger 41, that is, the depression of the plunger 41 will cause the plunger 41*a* to also move in a downward direction, but the depression of the plunger 41*a* will have no effect on the plunger 41. The depression of either plunger 41 or 41*a*, or both, will drive release lever arm 35 downward releasing the hookswitch spring pileup 16**. This will all become apparent from a more detailed description to follow.

Referring to the drawings, the hookswitch assembly comprises in part a main mounting bracket 125 which, along with spring bracket 131, are firmly affixed to the dial mounting base 1. The bracket 125 has a pivot screw 123 as described in the above-mentioned Wood application, for pivotally securing the Y-shaped lever member 120 thereto. A spring pileup 130 is mounted on spring bracket 131 adjacent to an ovoid bushing 124 attached to the extremity of leg 126 of the Y-shaped member, whereby this pileup will be operated by motion of the bushing.

Figure 2:
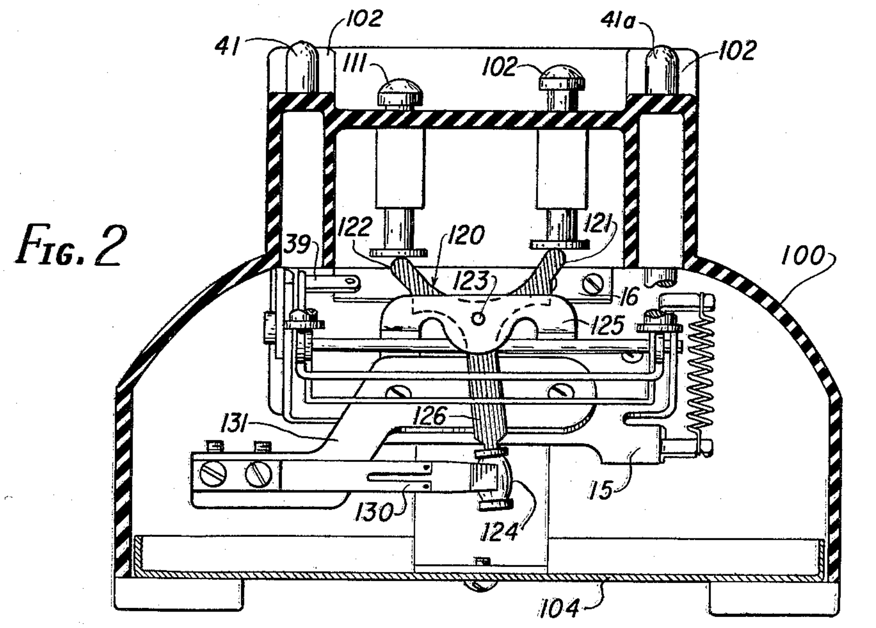
FIG. 2 is a cross section of the desk stand from a rear view.
Figure 3:
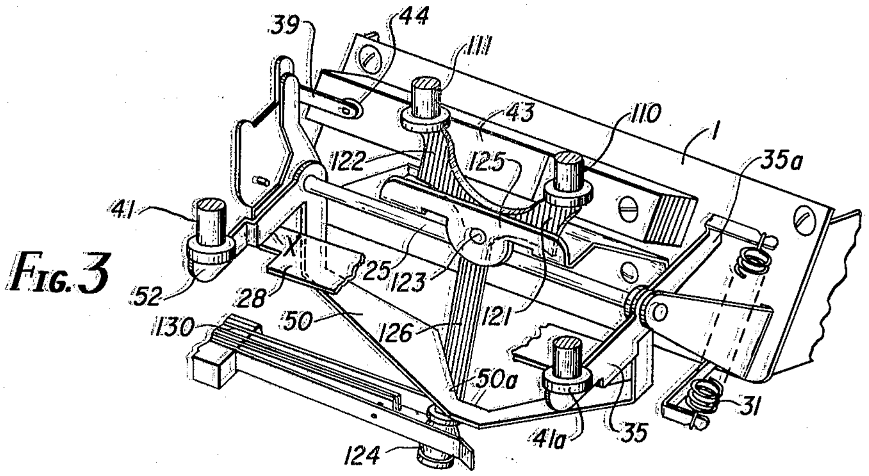
FIG. 3 is a rear perspective view of the hookswitch apparatus with certain portions cut out and cross sectioned.

The present invention differs from that disclosed in the cited Wood application, in that the hookswitch has two separate substantially U-shaped levers as viewed in FIG. 1, namely 28 and 50. The levers 28 and 50 both have at their outer ends, holes for enveloping the pivot pin 25, as shown in FIG. 3 for pivotal movement thereon. The lever 28 has the mentioned lever arm 35 supporting the hookswitch plunger **41*a* in the upright position shown. Also, the lever 28 has an indentation 28*a* to provide an opening for the lower leg 126 of the Y-shaped lever member 120. The other lever 50 also has a lever arm, namely 52 for supporting the hookswitch plunger 41 in the upright position shown. Lever arm 52 also rests upon a small portion X of lever 28, as seen in FIG. 3. Lever 50 as viewed in FIG. 1, presents a truncated scalene shaped appearance, with an off-centered cut away indentation 50*a* to provide a second opening for the lower leg 126. A hookswitch spring 31 is connected at one end to the mounting plate 1 and at the other end to an arm 35*a* of lever 28 to resiliently rotate lever 28 when the handset is removed from the hookswitch plungers, whereby the lever 28 will engage lever 50 at portion X to rotate lever 50** and cause the plungers to assume the upright position shown in FIGS. 2 and 3.

Each of the upper arms 121 and 122 of the Y-shaped member 120 have poised above them respectively plungers or buttons 110 and 111. These plungers are mounted midway between the tines 102 and substantially centrally in the cradle of the desk stand.

When the exclusion feature is to be used, the telephone instrument is in use with the handset out of the cradle, and plungers 41 and **41*a* in their released or up position. The extension telephone which may be disconnected from the line of the telephone shown, would be electrically connected to the terminals of the extension spring pileup 130**.

The operation is as follows: exclusion plunger 110 is depressed manually. Upper arm 121 follows the motion of the plunger 110 and moves downward pivoting about its pivot screw 123. Lower leg 126 moves toward the extension pileup 130 (from FIG. 2 position to FIG. 3 position) and the bushing 124 enters the spring pileup 130 and opens or closes the required contacts to exclude the extension telephone. The specific circuitry of this extension telephone connection may be of any of the generally known and used methods. The travel of the lower leg 126 is stopped by contact with the engagement of the slanted side of indentation **50*a*** as shown in FIG. 3 which defines the end of the Y member lower leg travel path. Once the Y member 120 has operated the springs of the spring pileup 130, the pileup remains operated by the bushing 124 thus excluding the extension telephone until the exclusion button is positively released.

Release may occur in two possible ways. The first method of release is by the use of the release button 111. Depression of the release button 111 depresses arm 122 of the Y-shaped member which causes the other arm 121 to pivot upward and assume a higher relative position, restoring plunger 110 to its normal position. Lower leg 126 is withdrawn from the spring pileup 130 to the extent that bushing 124 does not engage the exclusion springs of pileup 130.

The second method of restoring the exclusion button once it has been operated is accomplished by means of hook-switch plunger 41. Normally, this will occur when the handset is replaced in the cradle since the main reason for having an extension is that a call may be answered from any one of the handsets.

Restoration of the handset or the manual depression of plunger 41 forces lever arm 52 to depress, engaging lever 28 at portion X to cause depression also, pivoting hook-switch levers 50 and 28 about the pivot pin 25. The slanted edge of the indentation 50*a* in the operated position of the exclusion arrangement is in contact with the lower leg 126 of the Y member as mentioned previously. The slanted edge responds to the pivoting of lever 50 forcing the lower leg 126 to the right (as viewed from FIGS. 2 and 3) removing the bushing 124 from contact with pileup 130 and thus restoring the exclusion arrangements to normal.

In connection now with the feature of this invention, it may be necessary to signal an operator at a time when the exclusion button 110 is depressed, and it is desired to maintain the extension line excluded from the call. As is well-known in the art, the rapid depression and release of a hookswitch plunger will cause an operator's lamp at a switchboard to flash. It is therefore the intention of this invention to utilize only the hookswitch plunger 41*a* for this purpose to prevent release of the exclusion button 110.

With the exclusion button 110 depressed as shown in FIG. 3, a depression of hookswitch plunger 41*a* will cause lever arm 35 to depress causing lever 28 to pivot on pivot pin 25. Since lever 28 pivots under the lever arm 52 of lever 50, no engagement therebetween will take place. Furthermore, the indentation 28*a* of lever 28 will also not engage the lower leg 126, since the space between lever 28 and 50 is far enough apart to prevent such engagement as seen in FIG. 2.

Thus, the hookswitch plunger 41*a* may be rapidly depressed and released to signal an operator without effecting the operated exclusion button 110. The spring pileup 16 will thus respond by opening and closing the contacts therein responsive to the pivotal insertion and retraction of the bushing 39 attached to an extremity on lever 28 thru a hole 44 in the dust cover 43 of the spring pileup 16. The spring pileup 16 and operations thereof are described in detail in a Sargisson Patent 2,810,792.

What is claimed is:

1. A telephone desk set having a top portion comprising a cradle having a pair of front tines and a pair of rear tines for resting therein a handset, a first spring pileup, a first pair of plungers in said cradle, each of said plungers controlled by the removal of said handset from said cradle to release said first spring pileup, a second spring pileup, a second pair of plungers extending through said top portion in an area between said front tines, said second pair of plungers comprising an operating plunger and a separate release plunger, a rocker-type operating member rotated responsive to depression of said operating plunger to operate said second spring pileup, and a mechanical linkage between said rocker-type operating member on the one hand and one only of said first pair of plungers on the other hand, for restoring said operating member, such that said second spring pileup is released from operation responsive to depression of said release plunger and also under the control of said one but not the other of said first pair of plungers, whereby said other plunger may be intermittently operated without affecting the condition of said second spring pileup.

2. In a telephone subset mounting for a handset, a first and second hookswitch plunger extending from the upper surface of said mounting upon which said handset normally rests, a dial mounting base, a first substantially U-shaped hookswitch lever pivotally secured at its outer extremities to a pivot pin, a second substantially U-shaped hookswitch lever pivotally secured at its outer extremities to said pivot pin and lying directly below said first lever, a first integral arm extending perpendicular to the extremities of said first hookswitch lever for supporting said first plunger in an upright position, a second integral arm extending perpendicular to the extremities of said second hookswitch lever for supporting said second plunger in an upright position, a spring pileup secured to said dial mounting base having a signalling position and a non-signalling position, a third integral arm on said second lever disposed to actuate said spring pileup, resilient means effective to upwardly pivot said levers responsive to the removal of said handset from said plungers to cause said first and second integral arms to raise said plungers and cause said third integral arm to actuate said spring pileup into a signalling position, said first lever depressed to engage and pivot said second lever to actuate said spring pileup into a non-signalling position responsive to the depression of said first plunger, and said second lever depressed independently of said first lever to actuate said spring pileup into said non-signalling position responsive to the depression of only said second plunger.

3. In a telephone subset mounting for a handset, a plurality of plungers extending from the upper surface of said mounting, a first set of said plungers comprising an exclusion plunger and a release plunger, a first spring pileup adapted to be electrically connected to an extension telephone subset, a Y-shaped member pivotally mounted within said subset and having a first and second arm for supporting said first set of plungers thereon, said Y-shaped member having a leg rotated to operatively engage said first spring pileup responsive to the depression of said exclusion plunger to electrically disconnect said extension telephone subset, a second set of said plungers having a first and second hookswitch lever pivotally operated semi-independently by the depression of said second set of plungers, a second spring pileup independent of said first spring pileup adapted to be electrically connected to a telephone operator's switchboard, said first hookswitch lever engaged by said leg responsive to the depression of said exclusion plunger, said second hookswitch lever pivotally operated independently of said first hookswitch lever for electrically disconnecting said second spring pileup from said switchboard responsive to the depression of only a first plunger of said second set of plungers, and said first hookswitch lever pivotally operated to rotatably disengage said leg from said first spring pileup and pivotally operate said second hookswitch lever responsive to the depression of a second plunger of said second set of plungers.

4. In a telephone subset mounting for a handset, a plurality of plungers extending from the upper surface of said mounting, a first set of said plungers comprising an exclusion plunger and a release plunger, a first spring pileup adapted to be electrically connected to an extension telephone subset, a Y-shaped member pivotally mounted within said subset and having a first and second arm for supporting said first set of plungers thereon, said Y-shaped member having a downwardly extending leg adjacent said first spring pileup, said leg pivotally moved to engage said first spring pileup to electrically disconnect said extension telephone responsive to the depression of said exclusion plunger, a second set of plungers comprising a first and second hookswitch plunger, a first hookswitch lever rotatably secured within said subset and supporting said first hookswitch plunger, a second hookswitch lever rotatably secured within said subset and supporting said second hookswitch plunger, said first and second hookswitch levers having indentations to permit said leg to lie insertably perpendicular to said levers, a second spring pileup adapted to be electrically connected to a switchboard and activated by the rotation of said second hookswitch lever independently of said first hookswitch lever responsive to the depression of only said second hookswitch plunger, said indentation of said first lever having a slanted edge engaged by said leg responsive to said leg engaging said first spring pileup, and said first hookswitch lever effective to engage said second hookswitch lever to cause rotation thereof to cause said slanted edge to move said leg out of engagement with said first spring pileup and activate said second spring pileup responsive to the depression of said first hookswitch plunger.

5. In a telephone subset mounting for a handset, switch hook contacts having a signalling position and a non-signalling position, extension contacts having an extension position for an extension subset and an excluded position therefor, a plurality of plungers extending from the upper surface of said mounting comprising a first and second hookswitch plunger, an exclusion plunger, and a release plunger, pivot means pivotally operated responsive to the depression of said exclusion plunger for activating said extension contacts into said excluded position, a first hookswitch lever rotatably mounted within said subset and supporting said first hookswitch plunger, a second hookswitch lever rotatably mounted within said subset and supporting said second hookswitch plunger, said first hookswitch lever rotatable to engage and rotate said second hookswitch lever responsive to the depression of said first hookswitch plunger, a first and second integral means of said levers effective for pivotally restoring said pivot means for activating said extension contacts into said extension position and activating said switch hook contacts into said non-signalling position responsive to said depression of said first hookswitch plunger, and said second integral means activating said switch hook contacts into intermittent signalling and non-signalling positions respectively without effecting said first hookswitch lever responsive to the intermittent depression and release respectively of only second hookswitch plunger to rotate and restore said second hookswitch lever.

6. In a telephone system, a telephone set having a top portion comprising a cradle having a pair of front tines and a pair of rear tines for resting therein a handset, a hookswitch spring pileup, a pair of hookswitch plungers in said cradle, each said plunger controlled by removal of said handset from said cradle to release said hookswitch spring pileup, an exclusion spring pileup, an exclusion operating plunger and a separate exclusion release plunger in said top portion in an area between said front tines, a rocker-type operating member rotated responsive to depression of said exclusion operating plunger to operate said exclusion spring pileup, and rotated responsive to depression of said exclusion release plunger to release said exclusion spring pileup, and a mechanical linkage between said rocker-type operating member and only one of said pair of hookswitch plungers such that said operating member releases said exclusion spring pileup responsive to the depression of only said one plunger but not the other plunger of said pair, whereby said other plunger may be intermittently operated without affecting the condition of said exclusion spring pileup.

References Cited in the file of this patent

UNITED STATES PATENTS

| | | |
|---|---|---|
| 2,218,328 | Curran et al. | Oct. 15, 1940 |
| 2,589,180 | Wood et al. | Mar. 11, 1952 |
| 2,826,645 | Kessler | Mar. 11, 1958 |
| 2,946,856 | Wood | July 26, 1960 |